United States Patent
Wang et al.

(10) Patent No.: US 8,509,240 B2
(45) Date of Patent: Aug. 13, 2013

(54) GATEWAY, BASE STATION AND METHOD FOR WINDOW-BASED CONTENT SYNCHRONIZATION

(75) Inventors: Yonggang Wang, Shanghai (CN); He Wang, Shanghai (CN)

(73) Assignee: Alcatel Lucent, Paris, FL (US)

( * ) Notice: Subject to any disclaimer, the term of this patent is extended or adjusted under 35 U.S.C. 154(b) by 286 days.

(21) Appl. No.: 12/865,777

(22) PCT Filed: Jan. 23, 2009

(86) PCT No.: PCT/CN2009/000109
§ 371 (c)(1),
(2), (4) Date: Aug. 2, 2010

(87) PCT Pub. No.: WO2009/097744
PCT Pub. Date: Aug. 13, 2009

(65) Prior Publication Data
US 2011/0002311 A1 Jan. 6, 2011

(30) Foreign Application Priority Data
Feb. 2, 2008 (CN) .......................... 2008 1 0033551

(51) Int. Cl.
*H04L 12/28* (2006.01)
(52) U.S. Cl.
USPC ............................ 370/394; 370/468; 455/418
(58) Field of Classification Search
CPC ....... H04L 1/1848; H04L 47/10; H04L 47/14; H04L 1/1812; H04L 1/1874
USPC ................. 370/336, 394, 463, 468; 455/418
See application file for complete search history.

(56) References Cited

U.S. PATENT DOCUMENTS

2001/0036823 A1* 11/2001 Van Lieshout et al. ........ 455/418
2003/0086427 A1* 5/2003 Lee et al. ...................... 370/394
(Continued)

FOREIGN PATENT DOCUMENTS

CN 1110932 C 6/2003
CN 1866830 A 11/2006

OTHER PUBLICATIONS

International Search Report for PCT/CN2009/000109.
(Continued)

*Primary Examiner* — Jung Park
(74) *Attorney, Agent, or Firm* — Fay Sharpe LLP

(57) ABSTRACT

The present disclosure relates to a gateway, base station and method for window-based content synchronization technology. The gateway according the present invention comprises; a receiving unit for receiving a data packet; a window counting unit for counting the data packet, such that a predetermined number of packets forms a window, the number being a window size; a sequence number counting unit for generating a sequence number of the packet; a timestamp setting unit for setting a timestamp for the packet; and a processing unit for including the generated sequence number, the timestamp and a byte count in the packet to be transmitted. The base station according to the present invention comprises: a receiving unit for receiving a data packet; an information extracting unit for extracting a sequence number, a timestamp and byte count information from the data packet; a window counting unit for counting the received packets based on the extracted sequence number so as to form a window; and a processing unit for setting an anticipated air interface transmission time for the packets in the current window based on the extracted timestamp. The gateway or base station according to the present invention operates well with statistical multiplexing and has an improved overall performance in terms of synchronization processing delay and control packets load.

13 Claims, 6 Drawing Sheets

(56) References Cited

U.S. PATENT DOCUMENTS

2005/0152397 A1* 7/2005 Bai et al. ................. 370/468
2006/0104303 A1* 5/2006 Makineni et al. ............ 370/463

OTHER PUBLICATIONS

Supplementary European Search Report, EP No. 09709304.1-1246 / 2239880—PCT/CN2009000109, Mailing Date—Apr. 12, 2012; Date of completion of search—Nov. 19, 2012; 5 pgs.

Nokia et al., MBSFN Scheduling and Content Synchronization R3-071920, 3GPP TSG-RAN WG3 Meeting #57bis, Sophia Antipoli, France; Oct. 8-11, 2007; 11 pgs.

Alcatel-Lucent, Details of eMBMS Content Synchronization: R3-070220, 3GPP TSG-RAN WG3 #55, St. Louis, USA; Feb. 12-16, 2007; 8 pgs.

Ericsson, "MBMS L2 content synchronization", R3-070630, 3GPP TSG-RAN WG3 #55-bis, St. Julian, Malta, Mar. 27-30, 2007; 6 pgs.

Motorola, "LTE MBMS content synchronization", R3-070649, 3GPP TSG-RAN-WG3 Meeting #55bis, St. Julian's, Malta, Mar. 27-36, 2007; 3 pgs.

Alcatel-Lucent, "Comparison of Robust E-MBMS Content Synchronization Protocols", R3-072114, 3GPP TSG-RAN WG3 #58, Jeju Island, Nov. 5-9, 2007; 13 pgs.

* cited by examiner

GATEWAY, BASE STATION AND METHOD FOR WINDOW-BASED CONTENT SYNCHRONIZATION

FIELD OF THE INVENTION

The present invention relates to synchronization technology in mobile communication single frequency network, and more particularly, to a gateway, base station and method for window-based content synchronization technology.

BACKGROUND OF THE INVENTION

In RAN3#57bis and RAN2#59bis meeting, statistical multiplexing is agreed as a requirement for EMBMS multiplexing operation. According to an existing mechanism for content synchronization, a gateway determines whether data packets are segmented and concatenated at Layer 2 (L2) based on a fixed transmission rate at an air interface. In the case of statistical multiplexing, the transmission rate at the air interface varies over time, such that the gateway cannot determine whether the data packets are segmented and concatenated or not. Thus, it is necessary to separate content synchronization from other operations, no as to design a solution for content synchronization as an independent system. Consequently, the existing mechanism for content synchronization cannot cooperate with statistical multiplexing. In order to cooperate with statistical multiplexing commendably and fulfill the delay/robustness requirements of EMBMS, the content synchronization mechanism design should be revised.

In [R3-071920 MBSFN scheduling and content synchronization, Nokia. Nokia Siemens Network, 2007-10], Nokia simply proposed a solution for content synchronization based on fixed burst length, which can cooperate with statistical multiplexing. However, some key points are not clearly described in this solution. Moreover, it requires significant control packets load to achieve a 1 second processing delay requirement. On the other hand, the control mechanism in the Nokia solution lacks flexibility. Additionally, it is discovered by simulation that there is only one choice of parameter setting applicable in the Nokia solution.

Therefore, there is a need for a solution of content synchronization capable of overcoming the above defects of the Nokia solution.

According to the present invention, an ALU suggestion is provided for content synchronization design, which is referred to as "window-based solution" and operates well with statistical multiplexing.

SUMMARY OF THE INVENTION

To overcome the above defects, a gateway is provided, which comprises: a receiving unit for receiving a data packet to be transmitted to base stations; a window counting unit for counting the data packet to be transmitted, such that a predetermined number of packets forms a window, the number being a window size; a sequence number counting unit for generating a sequence number of the packet to be transmitted; a timestamp setting unit for setting a timestamp for each packet within the window, such that the timestamps for all the packets in the window are related to each other; and a processing unit for including the generated sequence number, the timestamp and a byte count in the packet to be transmitted, the byte count being the amount of the bytes of all the packets in the previous window, the byte count included in each packet of the window being the same.

Preferably, the processing unit adds to the header of the packet to be transmitted a layer of sync protocol which comprises the sequence number, the timestamp and the byte count.

Preferably, all the packets in the window have the same timestamp, which is defined as the time at which the gateway transmits the first packet of the window plus a maximum transmission delay, a maximum processing delay and a delay margin, the maximum transmission delay being a maximum delay required for transmission of a packet from the gateway to all the base stations associated with the gateway, and the maximum processing delay being a maximum processing delay required for a packet from being processed at L2 to being transmitted via an air interface at all of the base stations.

Preferably, the gateway further comprises: a timer for timing the period during which the receiving unit receives no data; a sync control packet generating unit for generating a sync control packet when the timer expires; and a transmission unit for transmitting the generated sync control packet.

Preferably, the sync control packet includes a sequence number which is the sequence number of the next packet to be transmitted; a timestamp which is the time at which the gateway generates the sync control packet plus the maximum transmission delay, the maximum processing delay and the delay margin; and a total byte count of the packets transmitted in the window terminated prior to the sync control packet.

Preferably, the length of the timer is set to the delay margin divided by a predetermined number N of retransmissions of the sync control packet.

Preferably, the gateway further comprises a window setting unit for setting and informing the size of a window to all the base stations associated with the gateway.

According to another aspect of the present invention, a base station is provided, which comprises: a receiving unit for receiving a data packet from a gateway; an information extracting unit for extracting a sequence number, a timestamp and byte count information from the received data packet; a window counting unit for counting the received packets based on the extracted sequence number so as to form a window; and an processing unit for processing the data packets within the window and setting an anticipated air interface transmission time for the packets in the current window based on the extracted timestamp.

Preferably, the anticipated air interface transmission time for the packets in the current window is set to the timestamp included in the sync protocol for the data packets in the next window.

Preferably, the base station further comprises a sync control packet determining unit for analyzing the received data packet so as to determine whether the received packet is a sync control packet.

Preferably, the sync control packet includes a sequence number which is a sequence number of the next packet to be transmitted; a timestamp; and a total byte count of the packets transmitted in the window terminated prior to the sync control packet.

Preferably, when the received packet is a sync control packet, the window counting unit forms a window based on the sequence number included in the sync control packet.

Preferably, the base station further comprises a packet loss determining unit for determining whether there is a packet loss based on the sequence number of the received packet or sync control packet, and performing a packet loss process when there is a packet loss.

Preferably, the packet loss determining unit determines whether there is a packet loss based on the continuity between the sequence number of the previously received packet and the sequence number of the currently received packet or sync control packet.

Preferably, the packet loss process comprises regenerating a number of packets such that the number of the regenerated packets is the difference between the discontinuous sequence numbers and the byte count of the regenerated packets is the difference between the total byte count of the received packets in the current window and the byte count included in the data packets of the next window or the total byte count included in the sync control packet.

Preferably, the length of the respective packets to be regenerated can be arbitrarily selected or evenly assigned when the number of the packets to be regenerated is larger than one.

Preferably, the base station further comprises an alerting unit for informing the gateway of a network transmission failure when a number of consecutive packets or a number N of consecutive sync control packets are lost, wherein said number of consecutive packets corresponds to the size of a window and said number N corresponds to the predetermined number of retransmissions.

According to a further aspect of the present invention, a method for processing data packets in a gateway for content synchronization is provided, which comprises the steps of: receiving a data packet to be transmitted to base stations; counting the data packet to be transmitted, such that a predetermined number of packets forms a window, the number being a window size; generating a sequence number of the packet to be transmitted; setting a timestamp for each packet within the window, such that the timestamps for all the packets in the window are related to each other; and including the generated sequence number, the timestamp and a byte count in the packet to be transmitted, the byte count being the amount of the bytes of all the packets in the previous window, the byte count included in each packet of the window being the same.

Preferably, the step of including the generated sequence number, the timestamp and the byte count in the packet to be transmitted comprises adding to the header of the packet to be transmitted a layer of sync protocol which comprises the sequence number, the timestamp and the byte count.

Preferably, all the packets in the window have the same timestamp, which is defined as the time at which the gateway transmits the first packet of the window plus a maximum transmission delay, a maximum processing delay and a delay margin, the maximum transmission delay being a maximum delay required for transmission of a packet from the gateway to all the base stations associated with the gateway, and the maximum processing delay being a maximum processing delay required for a packet from being processed at L2 to being transmitted via an air interface at all of the base stations.

Preferably, the method further comprises a step of timing the period during which the receiving unit receives no data; generating a sync control packet when the timing expires; and transmitting the generated sync control packet.

Preferably, the sync control packet includes a sequence number which is the sequence number of the next packet to be transmitted; a timestamp which is the time at which the gateway generates the sync control packet plus the maximum transmission delay, the maximum processing delay and the delay margin; and a total byte count of the packets transmitted in the window terminated prior to the sync control packet.

Preferably, the length of the timing is set to the delay margin divided by a predetermined number N of retransmissions of the sync control packet.

Preferably, the method further comprises a step of setting and informing the size of a window to all the base stations associated with the gateway.

According to a still further aspect of the present invention, a method for processing data packets in a base station for content synchronization is provided, which comprises the steps of: receiving a data packet from a gateway; extracting a sequence number, a timestamp and byte count information from the received data packet; counting the received packets based on the extracted sequence number so as to form a window; and processing the data packets within the window and setting an anticipated air interface transmission time for the packets in the current window based on the extracted timestamp.

Preferably, the step of setting an anticipated air interface transmission time for the packets in the current window based on the extracted timestamp comprises setting the anticipated air interface transmission time for the packets in the current window to the timestamp included in the sync protocol for the data packets in the next window.

Preferably, the method further comprises a step of analyzing the received data packet so as to determine whether the received packet is a sync control packet.

Preferably, the sync control packet includes a sequence number which is a sequence number of the next packet to be transmitted; a timestamp; and a total byte count of the packets transmitted in the window terminated prior to the sync control packet.

Preferably, when the received packet is a sync control packet, a window is formed based on the sequence number included in the sync control packet.

Preferably, the method further comprises a step of determining whether there is a packet loss based on the sequence number of the received packet or sync control packet, and a step of performing a packet loss process when there is a packet loss.

Preferably, the step of determining whether there is a packet loss comprises: determining whether there is a packet loss based on the continuity between the sequence number of the previously received packet and the sequence number of the currently received packet or sync control packet.

Preferably, the packet loss process comprises regenerating a number of packets such that the number of the regenerated packets is the difference between the discontinuous sequence numbers and the byte count of the regenerated packets is the difference between the total byte count of the received packets in the current to window and the byte count included in the data packets of the next window or the total byte count included in the sync control packet.

Preferably, the length of the respective packets to be regenerated can be arbitrarily selected or evenly assigned when the number of the packets to be regenerated is larger than one.

Preferably, the method further comprises a step of informing the gateway of a network transmission failure when a number of consecutive packets or a number N of consecutive sync control packets are lost, wherein said number of consecutive packets corresponds to the size of a window and said number N corresponds to the predetermined number of retransmissions.

The solution according to the present invention has the advantages over the prior art in that: (1) it can operate well with statistical multiplexing; and (2) it arrives at a superior overall performance in sync processing delay and control packet load.

BRIEF DESCRIPTION OF THE DRAWINGS

The above features and advantages of the present invention will be more apparent from following detailed description with reference to the drawings, in which.

DETAILED DESCRIPTION OF PREFERRED EMBODIMENTS

Figure 1:
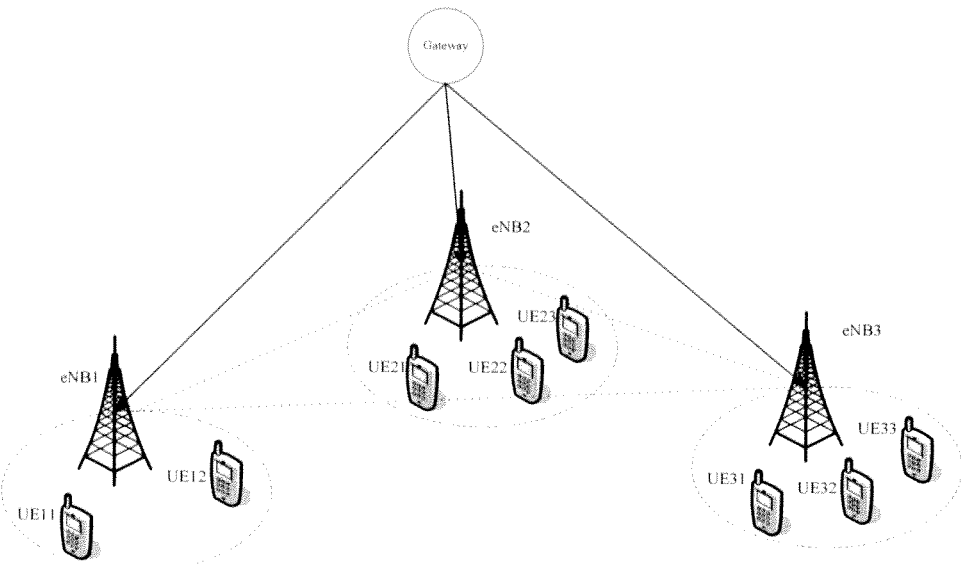
FIG. 1 shows a structure of a network in which the present invention can be implemented.

FIG. 1 shows a structure of a network in which the concept of the present invention can be implemented. As shown, an access gateway GW is connected to a plurality of base stations eNB1, eNB2 and eNB3 via an interface referred to as S1 interface. The plurality of base stations (eNBs) are interconnected in a mesh form as indicated in dashed lines in FIG. 1. An interface between the base stations is referred to as X2 interface. A plurality of User Equipments (UEs), i.e., UE11-UE12, UE21-UE23 and UE31-UE33, are illustrated in the respective cells of the base stations eNB1-eNB3.

Explanation of Sync Protocol

Figure 2:
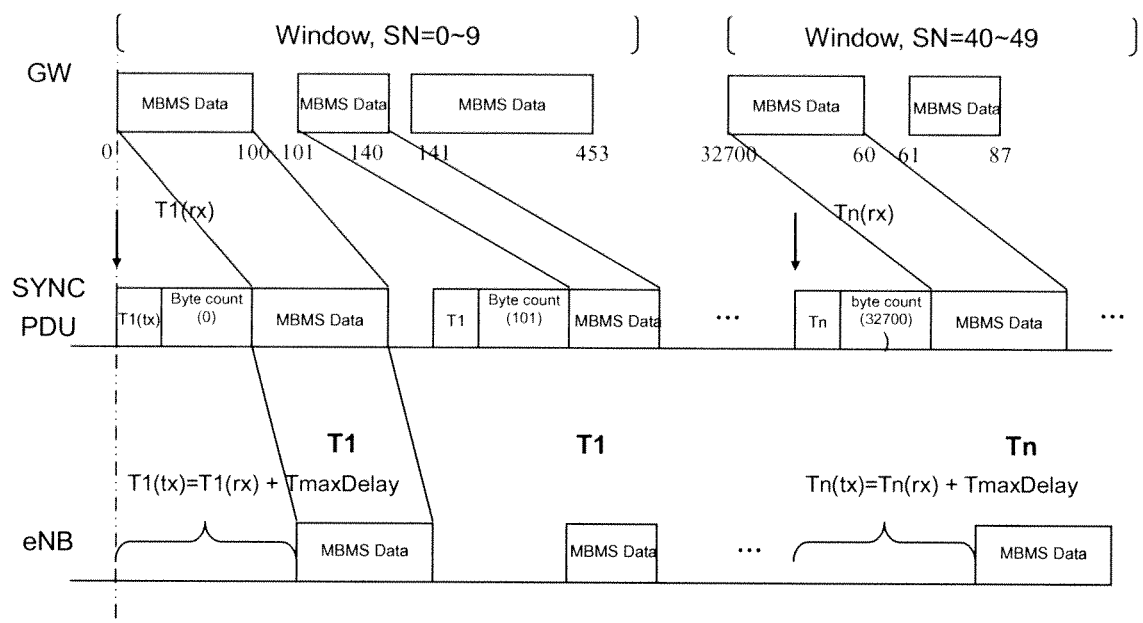
FIG. 2 shows a schematic diagram of a sync protocol PDU according to the present invention.

The basic concept of the method for window-based content synchronization according to the present invention is illustrated in FIG. 2. Herein, each sync protocol PDU at an M1 interface carries in a sync PDU header a timestamp and byte count information which are set by the gateway for indication of packet transmission time and packet loss processing. In the following, the key terms as used in the content sync protocol according to the present invention will be explained in detail.

1) Window

A window is composed of a particular number of packets. The size of the window, i.e., the number of packets therein, is pre-configured and known by each eNB in a SFN. The first window starts with a packet of SN=0 after the beginning of a session. When the gateway transmits a sync control packet, the window should be terminated immediately even if the size of the window is not reached yet.

The sync control packet indicates that there has been no data packet arrived for a long time, which will be defined hereinafter.

2) Timestamp

Each window is configured with a timestamp. For the first packet in a window, $T_{tx}=T_{rx}+T_{MaxDelay}$, where $T_{rx}$ is defined as the time at which the gateway receives a MBMS data packet. The timestamp corresponding to packet $P_n$ is shown in FIG. 2 as $T_n$. $T_{MaxDelay}$ is composed of a maximum transmission delay between the gateway and an eNB, a delay margin and a maximum eNB L2 processing time, and is defined as $T_{MaxDelay}=T_{TransDelay}+T_{Margin}+T_{ProcTime}$.

The timestamps for all the packets within a window are associated with each other, such that the timestamp of a packet in a window can be derived from that of any other packet in the same window. For example, the timestamps for the packets in a window can be set to be identical (as shown), arithmetically progressive or otherwise.

3) Anticipated Transmission Time

Once an eNB receives a packet pertaining to the next window or a sync control packet, it implies that all the packets of the previous window can be processed and transmitted. The timestamp of the packet pertaining to the next window or the timestamp included in the sync control packet indicates that, in the eNB, the transmission of all the packets in the previous window should be started over the air interface with the first transmission opportunity or after the indicated time.

The anticipated transmission time for a packet n is the timestamp of the packet in the next window or the timestamp of the immediately subsequent sync control packet, rather than the timestamp of the packet n. In this way, it can be ensured that, at the anticipated transmission time for the packets in a window, all the eNBs, including even the eNB with the largest S1 interface delay, can receive at least a number N of data packets in the next window or a sync control packet. Thus, it is ensured that, at the anticipated transmission time, all the packets in the window has been received or recovered, such that the synchronization can be guaranteed. Of course, the anticipated transmission time can be set to another time based on the timestamp of the packet n, as long as the time can be obtained by the eNBs.

4) Segmentation and Concatenation

All the packets in an RLC buffer having an anticipated transmission time earlier than the transmission time of a transmission block can be processed, i.e. segmented, concatenated and filled in the transmission block.

For service multiplexing, the transmission time of the transmission block can be "multiplexing period start time".

5) Byte Count

The byte count comprises the amount in byte of all packets in the whole previous window. The byte count contained in all packets of a window is the same. The byte count allows for determination of the total length of the lost packets.

6) Sequence Number

The sequence number (SN) is used to calculate the number of the lost packets, if any, in the eNBs.

7) One Length Indicator (LI) per Service Data Unit (SDU) Principle

A Radio Link Control Protocol Data Unit (RLC PDU) format with "one LI per SDU" principle for eMBMS is recommended. Multiple packets, therefore, can be recovered in content synchronization.

8) Statistic Multiplexing

The above content synchronization mechanism can guarantee the data of each service to be processed in a scheduling period to be identical and consistent among different eNBs.

The proportional fairness scheduling can be applied in statistic multiplexing.

SYNC Control Packet

A MBMS gateway monitors the status of packets delivered to the eNBs. First, the predetermined number N of retransmissions for a sync control packet is set for achieving reliable transmission of the sync control packet at the S1 interface. Once it is found that there has been no data packet transmitted for a time interval of $T_{Margin}/N$, the gateway transmits a sync control packet to the eNBs.

The sync control packet contains a sync header having a SN of the next packet, the total byte count for the packets transmitted in the previous window, and the new timestamp value of $T_{tx}=T_{rx}+T_{maxDelay}$, where $T_{rx}$ is defined as the time at which the gateway generates the sync control packet.

This sync control packet can be transmitted to the eNBs N times during the interval of $T_{Margin}$ so as to guarantee the reliable reception of the sync control packet at the eNBs.

The sync control packet can be distinguished from the data packets by setting a flag in the packet or utilizing other conventional approaches.

Recover of Packet Loss

Packet loss does not occur in normal situations and the consistency between different eNBs can be maintained by a content synchronization mechanism. However, in the particular case where packet loss occurs (e.g., the last packet containing the new timestamp is lost), the content synchronization will be compromised in service multiplexing, since the resource allocation for each service in an eNB involved is different from other eNBs during the current scheduling period.

To solve this problem, a window mechanism and a sync control packet are designed to recover from the loss of synchronization due to the particular packet loss case.

The eNBs can be aware of packets loss from the SN of the next correctly received packet.

The sync layer places dummy packets into the RLC buffer together with the anticipated transmission time recovered by the next correct packet. All transmission blocks containing parts of a dummy packet would be mute in the air interface.

In RAN2, in order to allow RLC to concatenate a plurality of RLC SDUs, variation of RLC payload might occur which could be indicated by a Length indicator (LI) field. With the RLC PDU format of "One LI per SDU", any packet loss can be recovered, as long as the eNBs know the number of the lost packets and the total size of lost packets and concatenate them together.

Abnormal Situation

The gateway or O&M can be informed of an abnormal network transmission problem if a number of consecutive packets or a number N of consecutive sync control frames are lost, the number of consecutive packets corresponding to the size of a window.

The above and other aspects of the present invention will be further detailed in the following with reference to the drawings.

Figure 3:
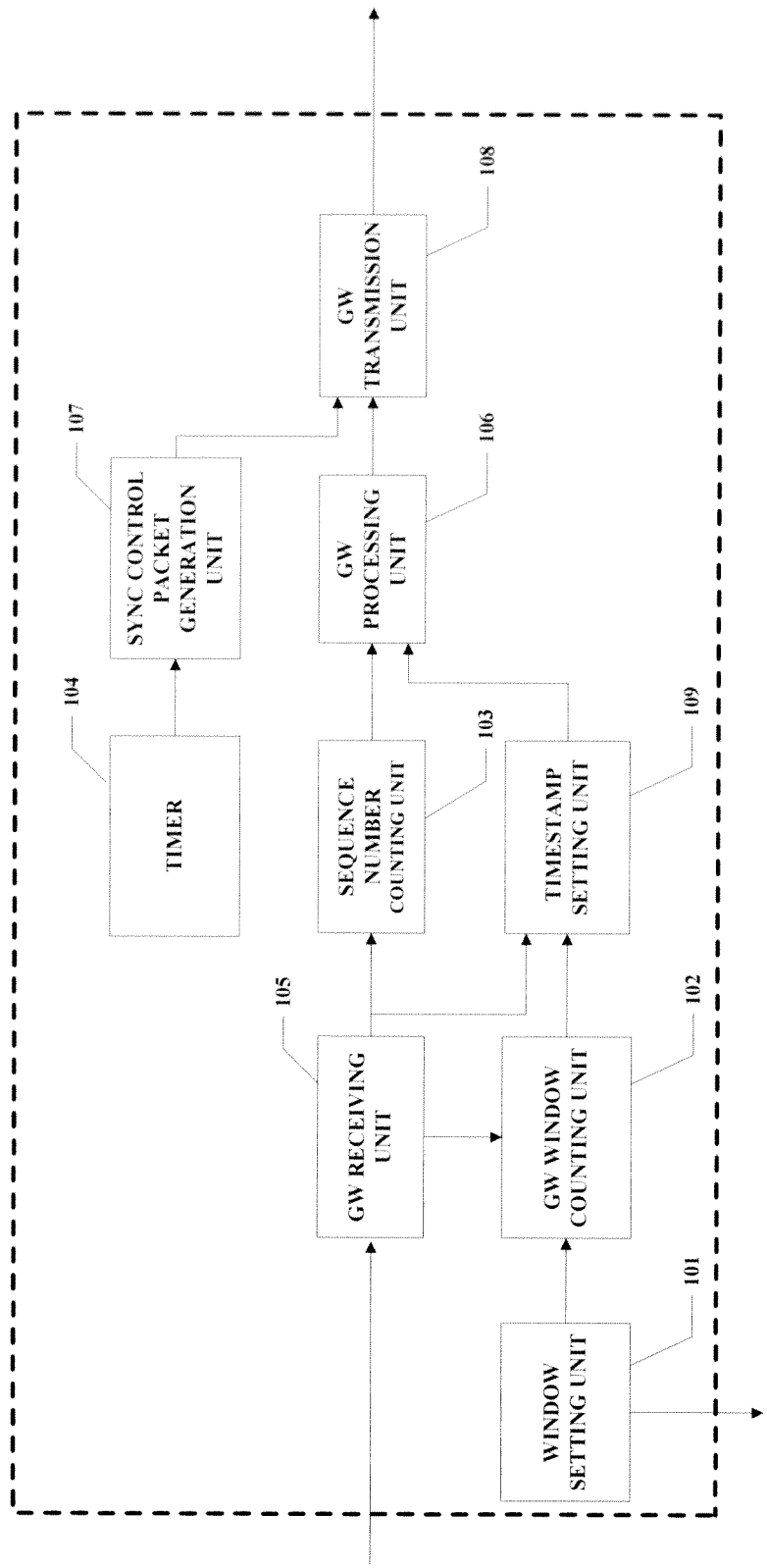
FIG. 3 shows a block diagram of a gateway according to the present invention.
Figure 4:
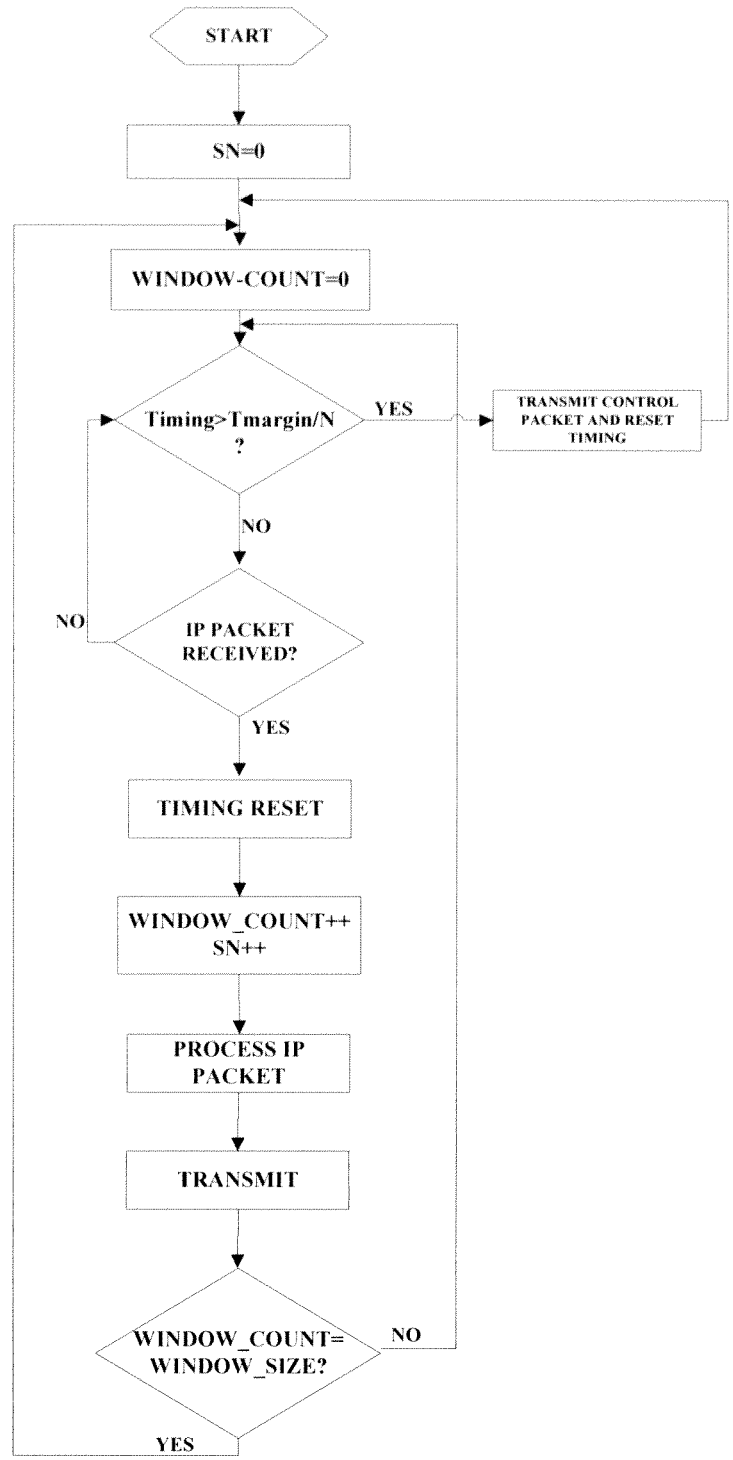
FIG. 4 shows a flowchart illustrating the operation of the gateway.

FIG. 3 shows a gateway according to the present invention for achieving content synchronization among a plurality of base stations (eNBs) associated with the access gateway. As shown, the gateway (GW) 100 according to the present invention comprises a window setting unit 101 for setting and informing the size of a window to all eNBs associated with the gateway 100; a GW window counting unit 102 for counting IP packets within a window; a sequence number counting unit 103 for counting IP packets to be transmitted, so as to generate a sequence number for each IP packet; a timer 104 for performing a timing operation; a GW receiving unit 105 for receiving an IP packet to be transmitted; a GW processing unit 106 for processing the IP packet to be transmitted; a sync control packet generation unit 107 for generating a sync control packet; a GW transmission unit 108 for transmitting the IP packet processed by the processing unit 106 or the sync control packet generated by the sync control packet generation unit 107 to all base stations associated with the gateway; and a timestamp setting unit 109 for setting a timestamp. The operation of the gateway 100 according to the present invention is illustrated in FIG. 4.

Initially, the window setting unit 101 of the gateway 100 defines a parameter for window size, WINDOW_SIZE, and informs the base stations. For the sake of convenience, the window size is assumed to be WINDOW_SIZE=5, where the numeral 5 denotes 5 packets at the S1 interface. It is further assumed that a service starts with the first packet with a sequence number of 0 from which the first window starts. Thus, the sequence number counting unit 103 counts the sequence number (SN) from zero and the GW window counting unit 102 also starts counting the window as WINDOW COUNT. In this way, when the GW receiving unit 105 receives an IP packet transmitted from a broadcast multicast service center, the sequence number counting unit 103 increments the sequence number by one to generate the sequence number of the IP packet. The IP packet is processed by GW processing unit 106, as described hereinafter, and then transmitted by the GW transmission unit 108 to all the base stations associated with the gateway 100 in an IP multicast manner.

Firstly, the gateway adds to the header of each packet a layer of sync protocol which comprises the three items: 1) a sequence number counted by the sequence number counting unit 103 where the sequence number is counted, for example, from 0 to 65535 in a round-bin manner; 2) a timestamp which in an embodiment of the present invention is the time at which the first packet of a window is transmitted from the gateway plus a maximum transmission delay, a maximum processing delay and a delay margin, the maximum transmission delay being a maximum delay required for transmission of a packet from the gateway to all the base stations associated with the gateway, and the maximum processing delay being a maximum processing delay required for a packet from being processed at L2 to being transmitted via an air interface at all of the base stations; and 3) a byte count indicating the amount of the bytes of all the packets in the previous window, the byte count included in each packet of the window being the same.

According to this embodiment of the present invention, the timestamps of all the packets within a window are set to be identical. That is, all the packets within a window have the same timestamp which is the timestamp of the first packet. Of course, the timestamps within a window can be different as noted above, as long as the timestamps are associated with each other. In other words, the location relationship among the timestamps within a window can be derived from their corresponding sequence numbers, and thus a timestamp of a packet can be derived from timestamps of other packets in the same window.

The gateway adds a layer of sync protocol to the header of each packet and transmits the packet to all the base stations associated with the gateway in an IP multicast manner.

Each time the GW transmission unit 108 transmits a packet, the GW window counting unit 102 increments the window count by one. When the window count reaches the window size, WINDOW_SIZE (e.g., 5), it indicates that the next packet is the start of a new window. At this time, the window count is reset and the GW receiving unit 105 waits for receiving the next IP packet.

The gateway is configured with a timer, e.g., a timer 104, for avoiding the case where the next packet to be received by the gateway fails to arrive for a long time. The length of the timer is set to be T, where T=delay margin/N and N is the number as defined above. The timer expires when a period of the length of T has elapsed since a packet transmitted from the broadcast multicast service arrived at the gateway without arrival of the next packet. As such, the gateway transmits to the base stations a sync control packet indicating the termination of the current window. In this case, the window ends although the size of the window has not been reached yet. The sync control packet is generated by the sync control packet generation unit 107 and comprises the following fields: a sequence number which is the sequence number of the next data packet to be transmitted; a timestamp which is the time at which the sync control packet is transmitted from the gateway plus the maximum transmission delay, the maximum processing delay and the delay margin; and a total byte count of all the packets within the currently terminated window. The length T of the timer is set as T=delay margin/N, such that the sync control packet can be retransmitted N times within the duration of the delay margin to ensure reliable transmission of the sync control packet.

Figure 5:
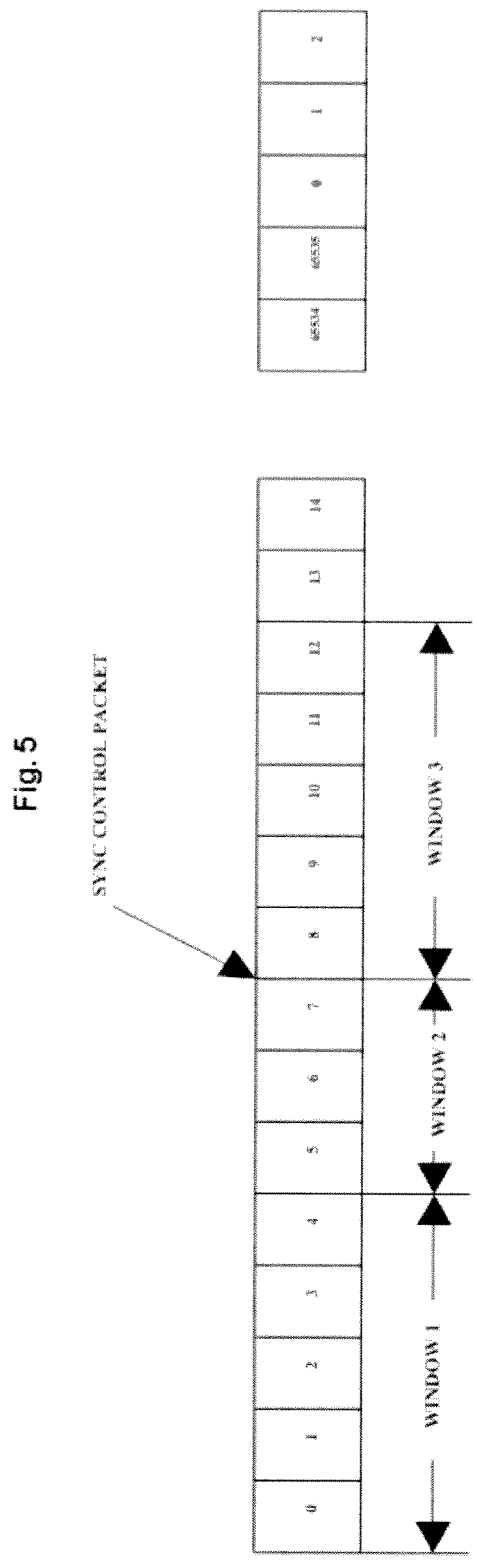
FIG. 5 shows a schematic diagram illustrating the relationship between a sync control packet and a window according to the present invention.

When the next data packet arrives at the gateway, it indicates the start of a new window for which all the related operations are the same as the previous window. Although the sync control packet has a sequence number field, it indicates the sequence number of the next data packet to be transmitted. Thus, the sync control packet is not involved in the counting of sequence number, as shown in FIG. 5.

The gateway according to the present invention performs the above process cyclically to transmit the received IP packet or the sync control packet to its associated base stations.

Figure 6:
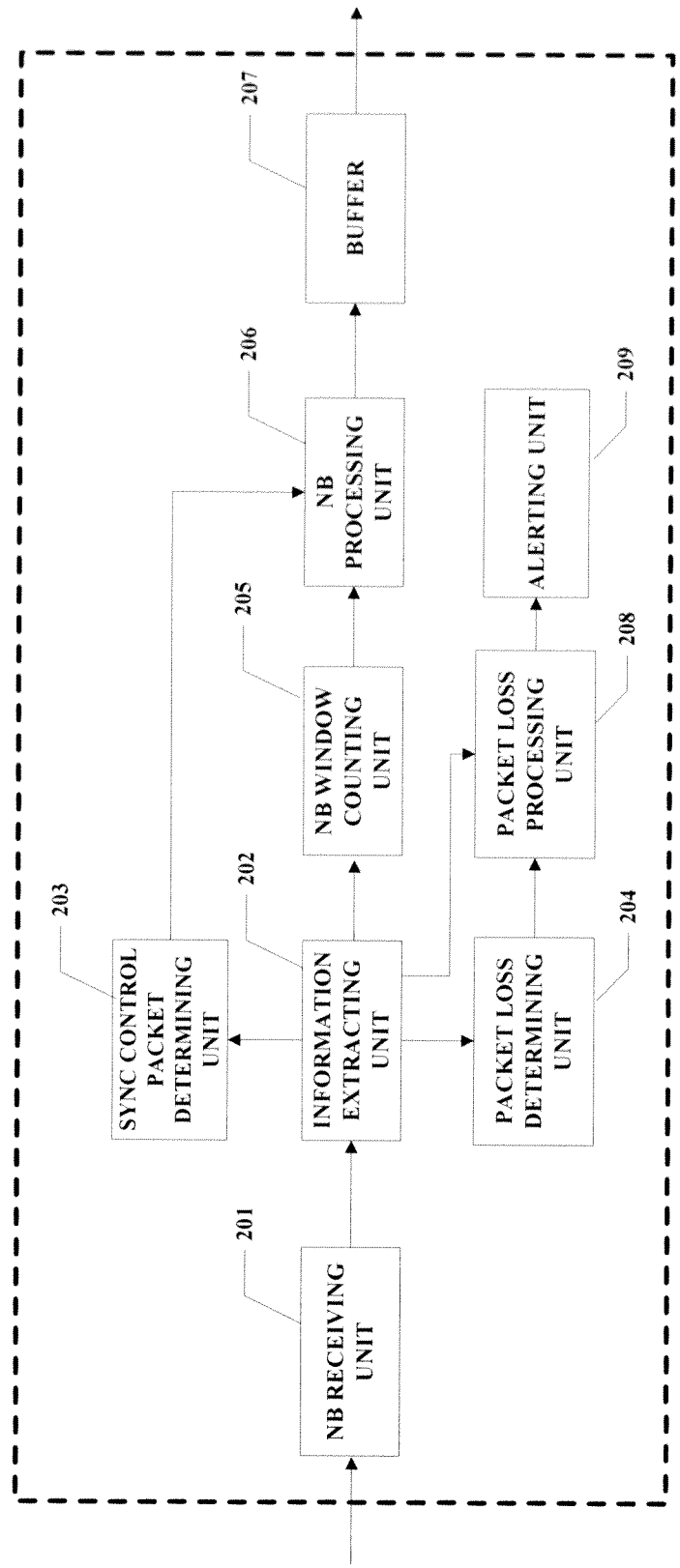
FIG. 6 shows a block diagram of a base station according to the present invention.

FIG. 6 illustrates the base station according to the present invention. The base station (Node B) 200 according to the present invention comprises: a NB receiving unit 201 for receiving a packet; an information extracting unit 202 for extracting a sequence number, a timestamp and a byte count from the received data; a sync control packet determining unit 203 for determining whether the received packet is a sync control packet; a packet loss determining unit 204 for determining whether there is a packet loss; a NB window counting unit 205 for counting IP packets of a window; a NB processing unit 206 for processing all the IP packets within the window; a base station buffer 207 for buffering the IP data packet received from the gateway; a packet loss processing unit 208 for performing a packet loss process when the packet loss determining unit 204 determines that there is a packet loss.

Figure 7:
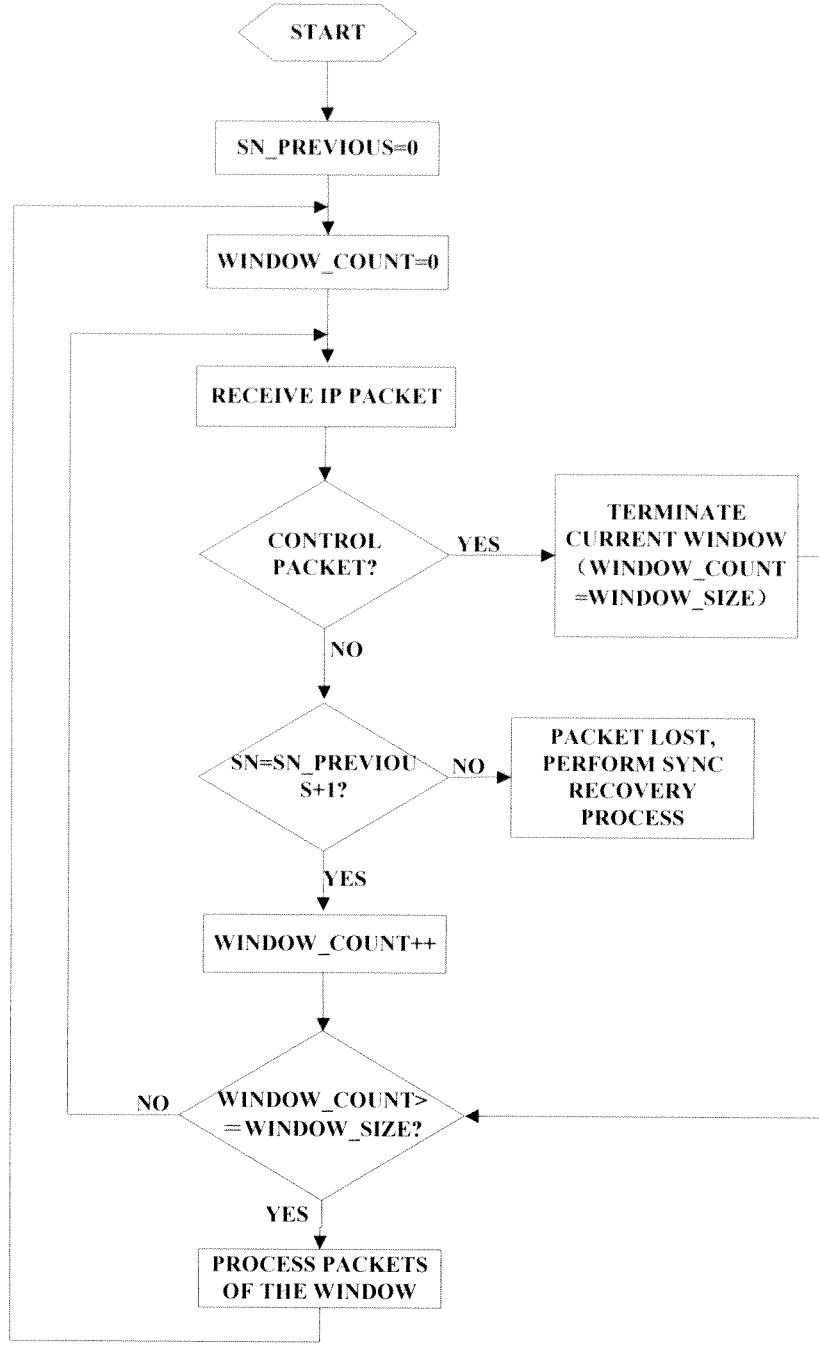
FIG. 7 shows a flowchart illustrating the operation of the base station.

FIG. 7 shows the operation of the base station 200 of FIG. 6. Again, it is assumed that the service starts with the first packet with a sequence number of 0 from which the first window starts. Of course, N sync control packets can be sent prior to the start of a service data packet, so as to indicate to the base station the start of the window.

The NB receiving unit 201 of the base station receives data packets from the first packet of the first window. Each time the base station receives a packet, the information extracting unit 202 extracts the values of the following fields from the sync protocol of the packet: a sequence number; a timestamp indicating the time at which the packet of the previous window was transmitted over the air interface; and a byte count for recovering the number of bytes of the packet possibly lost in the previous window.

Herein, the packet loss determining unit 204 can determine whether there is a packet loss prior to the received packet based on the continuity of the sequence number. If there is a packet loss, it can be determined how many packets are lost based on the difference between the sequence number of the received packet and the sequence number of the last received packet. Meanwhile, the window counting unit 205 counts the sequence number of the received data packet. When the count reaches the window size, it indicates that the next data packet is the start of a new window. The counting of the window is based on the sequence number, rather than the received data packet. For example, assuming that the current window starts with the packet having the sequence number of 0, the packets having the respective sequence numbers of 0, 1, 2, 3 and 6 are received. In this case, the packets in the current window have the sequence numbers of 0, 1, 2, 3 and 4, respectively, and the packets in the next window have the sequence number of 5, 6, . . . , respectively. Upon receipt of the packet with the sequence number of 6, the packet loss determining unit 203 can determine that two packets are lost for the current window and one for the next window, based on the difference between the sequence number 6 and the sequence number 3 of the last received packet as well as the window size of 5. A process for packet loss is performed upon determination of the packet loss.

Each time the base station has received all the packets of a window and started receiving data packets of the next window, the processing unit 206 of the base station processes the packets of the window in which all the packets are received. That is, the processing unit 206 assigns the timestamp included in the sync protocol in the data packet of the next window to the data packets of the current window and names it as an anticipated air interface transmission time which is placed into the L2 (RLC) buffer together with all the data packets of the window. The anticipated air interface transmission time means that the data packets are filled into a transmission block of an air interface protocol frame, which should be transmitted over the air interface exactly at or later than that time.

Each time the base station has received all the packets of a window and started receiving data packets of the next window, all the packets of the window can be processed by a L2 user interface of the base station and transmitted over the air interface. Of course, any packet pertaining to a window prior to this window which remains in the L2 buffer and has not been transmitted over the air interface is required to be transmitted over the air interface sequentially.

Process Upon Reception of a Sync Control Packet

When the sync packet determining unit 203 of the base station determines that one or more consecutive sync control packets are received, it indicates that the current window is terminated by the sync control packets and the last packet of the current window has a sequence number that is the sequence number of the sync control packet minus 1. In this case, the packets within the window are illustrated in FIG. 5. All the processes for these packets are the same as the case where all the packets of a window are received. That is, the base station assigns the timestamp included in the sync control packet to the data packets of the current window and names it as an anticipated air interface transmission time which is placed into the L2 (RLC) buffer together with all the data packets of the window.

Process for Packet Loss

If the base station receives a packet and the packet loss determining unit 204 detects the discontinuity between the sequence number of the received packet and the sequence number of the last received packet, it indicates that there is a packet loss and the synchronization recovery process by the packet loss processing unit 208 is required. Each time the base station has received all the packets of a window and started receiving data packets of the next window, or the current window is terminated by a sync control packet, the base station obtains the total byte count of all the packets received in the current window and then extracts the byte count from the data packet of the next window or the sync control packet. The total byte count of all the packets lost in the current window can be calculated by subtracting the total byte count from the extracted byte count. The number of packets lost in the current window can be obtained based on the discontinuous sequence numbers. The lost packets are recovered by means of regeneration. If the number of the lost packet equals to 1, the length of the lost packet is the byte count of the single packet to determined to be lost in the current window. If the number of lost packets is greater than 1, the total length of the lost packets is the total byte count of all the packets determined to be lost in the current window. The length of each packet can be assigned arbitrarily or uniformly. The regenerated packets are identified as dummy and have invalid data content but the same total length as the real packets. L2 knows which packet is the recovered dummy packet, and the transmission block containing such a dummy packet has no transmission power when transmitted over the air interface, i.e., the transmission block is silent.

According to the present invention, the base station further comprises an alerting unit 209 for informing the gateway or O&M an abnormal network transmission problem if a number of consecutive packets or a number N of consecutive sync control frames are lost, the number of consecutive packets corresponding to the size of a window.

Performance Comparison Between ALU and Nokia Solutions

In R3-071920 MBSFN scheduling and content synchronization, Nokia, Nokia Siemens Network, 2007-10, Nokia simply proposed a solution for content synchronization based on fixed burst length. Its "total counter frame" is similar to the sync control packet according to the present invention, and has the similar information, including total byte count of the previous burst (which is in the present invention the previous window), a timestamp, the total number of packets in the previous burst. In Nokia's solution, however, a fixed length burst is defined first as for example 1 second or another value. The frequency of generation of the "total counter frame" is defined according to the burst length. The sync processing delay is also affected by this burst length. According to a simulation for the Nokia solution, only the burst timing length set as 0.5 s is acceptable with respect to the performance of sync layer processing delay and the number of control packets.

In the ALU solution according to the present invention, the window size and burst timing length are two factors critical to the performance. It is more flexible to combine these two parameters to control the performance in terms of the sync layer processing delay and the number of control packets. According to a simulation, the appropriate parameters setting for the ALU solution are a window size of 5 and a burst timing length of 0.1 s.

The parameter setting for the Nokia solution can be a burs timing length of 0.5 s.

Herein, given the above parameters setting, the following comparison is made between the performances of the ALU and Nokia solutions in terms of the sync layer processing delay and the number of control packets.

For the performance of sync layer processing delay, the ALU solution obtains 0.6768 s and the Nokia solution obtains 0.6582 s, with a difference of 0.0186 s. Thus, these two solutions have the similar sync layer processing delay performance. However, for the number of control packets, there is a significant difference between these two solutions. The ALU solution only generates 695 control packets while the Nokia solution has 11989 control packets, which is 17.25 times as many as the ALU solution. Overall, the ALU solution is superior to the Nokia solution.

INDUSTRIAL APPLICABILITY

The content synchronization according to the present invention can operate well with statistical multiplexing and fulfill the basic 1 second processing delay requirement with less control packets load.

Although the present invention has been disclosed above with the preferred embodiments, it can be understood by those who skilled in the art that any modifications and alternatives can be made without departing from the scope of the present invention. Therefore, these modifications and alternatives are encompassed by the scope of the present invention which is defined by the attached claims only.

What is claimed is:

1. A base station comprising:
a receiving unit configured to receive data packets from a gateway;
an information extracting unit configured to extract a sequence number, a timestamp and byte count information from each of the received data packets;
a window counting unit configured to count the received data packets based on the extracted sequence number of each of the received data packets so as to form a window; and
a processing unit configured to process the counted received data packets within the window and set an anticipated air interface transmission time for the data packets in the current window based on the extracted timestamp;
a sync control packet determining unit configured to analyze the received data packet to determine whether the received data packet is a sync control packet;
wherein the sync control packet includes a sequence number which is a sequence number of a next packet to be transmitted; a timestamp; and a total byte count of the packets transmitted in a window terminated prior to the sync control packet.

2. A method for processing data packets in a gateway for content synchronization, comprising:
receiving data packets to be transmitted to base stations;
counting the data packets to be transmitted, such that a predetermined number of data packets forms a window, the predetermined number being a window size;
generating a sequence number for each of the data packets to be transmitted;
setting a timestamp for each of the data packets within the window, such that the timestamps for all the data packets in the window are related to each other; and
including the generated sequence number, the timestamp and a byte count in the data packet to be transmitted, the byte count being an amount of the bytes of all data packets in an immediately previous window, the byte count included in each packet of the window being the same.

3. The method of claim 2, wherein all the packets in the window have the same timestamp, which is defined as the time at which the gateway transmits the first packet of the window plus a maximum transmission delay, a maximum processing delay and a delay margin, the maximum transmission delay being a maximum delay required for transmission of a packet from the gateway to all the base stations associated with the gateway, and the maximum processing delay being a maximum processing delay required for a packet from being processed at L2 to being transmitted via an air interface at all of the base stations.

4. The method of claim 2, further comprising timing a period during which the receiving unit receives no data; generating a sync control packet when the timing expires; and transmitting the generated sync control packet.

5. The method of claim 4, wherein the sync control packet includes a sequence number which is the sequence number of a next packet to be transmitted; a timestamp which is the time at which the gateway generates the sync control packet plus a maximum transmission delay, a maximum processing delay and a delay margin; and a total byte count of the packets transmitted in the window terminated prior to the sync control packet.

6. The method of claim 5, wherein a length of the timing is set to the delay margin divided by a predetermined number N of retransmissions of the sync control packet.

7. A method for processing data packets in a base station for content synchronization, comprising:

receiving data packets from a gateway;

extracting a sequence number, a timestamp and byte count information from each of the received data packets;

counting the received data packets based on the extracted sequence number of each of the received data packets so as to form a window;

processing the counted received data packets within the window and setting an anticipated air interface transmission time for the data packets in a current window based on the extracted timestamp;

analyzing the received data packet to determine whether the received data packet is a sync control packet;

wherein the sync control packet includes a sequence number which is a sequence number of a next packet to be transmitted; a timestamp; and a total byte count of the packets transmitted in a window terminated prior to the sync control packet.

8. The method of claim 7, wherein setting an anticipated air interface transmission time for the packets in the current window based on the extracted timestamp comprises setting the anticipated air interface transmission time for the packets in the current window to the timestamp included in the sync control packet.

9. The method of claim 7, wherein when the received packet is the sync control packet, a window is formed based on the sequence number included in the sync control packet.

10. The method of claim 7, further comprising determining whether there is a packet loss based on the sequence number of the received packet or sync control packet, and performing a packet loss process when there is a packet loss.

11. The method of claim 10, wherein determining whether there is a packet loss comprises: determining whether there is a packet loss based on a continuity between the sequence number of a previously received packet and the sequence number of a currently received packet or sync control packet.

12. The method of claim 11, wherein the packet loss process comprises regenerating a number of packets such that the number of the regenerated packets is the difference between discontinuous sequence numbers and the byte count of the regenerated packets is a difference between a total byte count of the received packets in the current window and a byte count included in the data packets of a next window or a total byte count included in the sync control packet.

13. The method of claim 10, further comprising informing the gateway of a network transmission failure when a number of consecutive packets or a number N of consecutive sync control packets are lost, wherein said number of consecutive packets corresponds to a size of the window and said number N corresponds to a predetermined number of retransmissions.

* * * * *